(12) United States Patent
Filali (10) Patent No.: US 9,786,161 B2
(45) Date of Patent: Oct. 10, 2017

(54) METHODS AND SYSTEMS FOR ESTIMATING ROAD TRAFFIC (71) Applicant: QATAR UNIVERSITY QSTP-B, Doha (QA)

(72) Inventor: Fethi Filali, Doha (QA)

(73) Assignee: QATAR UNIVERSITY QSTP-B, Doha (QA)

( * ) Notice: Subject to any disclaimer, the term of this patent is extended or adjusted under 35 U.S.C. 154(b) by 0 days.

(21) Appl. No.: 14/395,758

(22) PCT Filed: Apr. 1, 2013

(86) PCT No.: PCT/IB2013/052599
§ 371 (c)(1),
(2) Date: Oct. 20, 2014

(87) PCT Pub. No.: WO2014/162169
PCT Pub. Date: Oct. 9, 2014

(65) Prior Publication Data
US 2016/0012722 A1   Jan. 14, 2016

(51) Int. Cl.
*G08G 1/01* (2006.01)
*G08G 1/017* (2006.01)
*G08G 1/052* (2006.01)
*H04L 29/08* (2006.01)
*H04W 4/04* (2009.01)

(52) U.S. Cl.
CPC ......... *G08G 1/0145* (2013.01); *G08G 1/017* (2013.01); *G08G 1/0112* (2013.01); *G08G 1/0116* (2013.01); *G08G 1/0125* (2013.01); *G08G 1/052* (2013.01); *H04L 67/12* (2013.01); *H04W 4/046* (2013.01)

(58) Field of Classification Search
None
See application file for complete search history.

(56) References Cited

U.S. PATENT DOCUMENTS

| 6,334,086 | B1* | 12/2001 | Park | G08G 1/0104 340/905 |
| 2003/0069683 | A1* | 4/2003 | Lapidot | G01C 21/34 701/117 |
| 2008/0140305 | A1* | 6/2008 | Kim | G08G 1/096716 701/117 |
| 2010/0174474 | A1* | 7/2010 | Nagase | G08G 1/01 701/118 |

(Continued)

*Primary Examiner* — Rami Khatib (57) ABSTRACT

Disclosed are systems and methods for estimating road traffic in a road segment at a given time. The system comprising: a central server; and at least one of one or more mobile communication units installed in a vehicle passing the road segment at the given time, wherein each of the mobile communication unit is capable of sending a plurality of mobile spot values to the central server, and one or more fixed communication units installed for detecting wireless enabled objects in vehicles passing the road segment at the given time, wherein each of the fixed communication unit is capable of sending a plurality of detected spot values to the central server. The central server is capable of processing the at least one of the plurality of mobile spot values and the plurality of detected spot values to estimate road traffic in the road segment at the given time.

23 Claims, 6 Drawing Sheets (56) References Cited

U.S. PATENT DOCUMENTS

| | | | | |
|---|---|---|---|---|
| 2012/0083995 A1* | 4/2012 | Vorona | ............... | G08G 1/0104 |
| | | | | 701/119 |
| 2012/0130625 A1* | 5/2012 | Srivastava | ......... | G01C 21/3492 |
| | | | | 701/119 |
| 2012/0316765 A1* | 12/2012 | Marko | ............... | G08G 1/0112 |
| | | | | 701/119 |

* cited by examiner

METHODS AND SYSTEMS FOR ESTIMATING ROAD TRAFFIC

FIELD OF THE INVENTION

The present invention generally relates to techniques for determining road traffic conditions, and more particularly, to methods and systems for computing average speed and travel time in a road segment.

BACKGROUND OF THE INVENTION

Given the clear impact that mobility has on economic and social development, the continuous increase in the number of vehicles coupled with the increase in mobility behaviour of people are creating new problems and challenges that need to be holistically addressed to ensure safe, sustainable, efficient and environmentally friendly mobility systems. In this context, increasing road traffic congestions can represent a serious risk for countries to lose their economic competitiveness. Therefore, there has been an increasing focus globally to use Intelligent Transport Systems (ITS) and applications to address transport and mobility issues.

As the economy is increasing the road traffic has continued to keep pace with the growing economy. More and more industries, companies, offices add more and more employees which eventually increases the vehicles on the roads. The road traffic has increased at rates greater than growth in road infrastructure capacity. Accordingly, there are more number of vehicles to be accommodated in a deficiently growing infrastructure system, thereby resulting in traffic congestion. As used herein, traffic congestion refers to a condition on road networks that occurs as use increases, and is characterized by slower speeds, longer trip times, and increased vehicular queuing. The most common example is the physical use of roads by vehicles. When traffic demand is great enough that the interaction between vehicles slows the speed of the traffic stream, this results in some congestion. As demand approaches the capacity of a road (or of the intersections along the road), extreme traffic congestion sets in. The effects of increasing traffic congestion have had growing effects on businesses, government operations and on individuals. Most of the people spend too much time getting stuck in traffic jams than the travel time to their workplace. The time spent in traffic congestion is non productive and waste of energy. Efforts have been made to tackle the increasing traffic congestion in various ways, such as by obtaining information about current traffic conditions and providing the information to individuals and organizations. By knowing the current traffic congestion about a road, an individual can make a decision to travel from another route to avoid getting stuck in the traffic. The current traffic condition information of a route may be provided to interested parties in various ways like by frequent radio broadcasts, an Internet Web site that displays a map of a geographical area with color-coded information about current traffic congestion on some major roads in the geographical area, information sent to cellular telephones and other portable consumer devices etc. Estimating the traffic congestion on roads is very useful for all users (customers, enterprise, and government agencies) since it helps in optimizing routing and reducing $CO_2$ emissions.

Presently, one method of obtaining current traffic condition includes observations shared by fellow travelers who are travelling on a road segment of interest. They share their experience about the time taken on the road to cross a certain street. For example, a person can tell that he entered the street at 9:30 A.M. and exited around 10:15 A.M. The traffic information providing agency, for example, a FM radio channel, receives it and calculates the travel time and average speed for crossing the particular street whose length is known. The FM radio channel broadcasts the traffic information to its audience and the audience can make decision of changing routes based on their needs. While human-supplied observations may provide some value in limited situations, such information is typically limited to only a few areas at a time and typically lacks sufficient detail to be of significant use.

Another method used in some larger metropolitan cities includes networks of traffic sensors capable of measuring traffic for various roads in the area, for example, via sensors embedded in the road pavement. The sensors may be Bluetooth technology based and detect the Bluetooth device in a vehicle and report its identifier, time of detection, its class, the radio signal strength (RSSI), and the like. Such data from a plurality of sensors along the road can help in predicting the travel time on the road at a particular time.

Information about road traffic conditions may also be obtained from vehicles on the road, which include a GPS ("Global Positioning System") device and/or other geo-location device capable of determining the geographic location, speed, direction, and/or other data that is related to the vehicle's travel. The devices on the vehicle (like GPS) or a distinct communication device may from time to time provide such data by way of a wireless link to systems able to use the data. This information can be also obtained from Road-Side Units (RSUs) that are deployed along roads and receive data from nearby On-Board Units (OBUs) using vehicular to infrastructure short range communication technologies like the 802.11p standard which will be also used for vehicle to vehicle communications.

GPS and other communication devices on the vehicle and the Bluetooth sensors on the roads may communicate with external systems that can detect and track information about vehicles (for example, vehicles passing by each of multiple receivers on the road in a network operated by the system), thus allowing location and movement information for the vehicles without interacting with devices (for example, camera systems that can observe and identify license plates and/or users' faces). Such external systems may include, for example, cellular telephone towers and networks, other wireless networks (for example, a network of Wi-Fi hotspots), detectors of vehicle transponders using various communication techniques (for example, RFID, or "Radio Frequency Identification"), other detectors of vehicles and/or users (e.g., using infrared, sonar, radar or laser ranging devices to determine location and/or speed of vehicles), and the like.

A huge amount of data from a plurality of vehicles or sensors is obtained at different timestamps. The obtained data may include multiple data samples, including data samples provided by mobile data sources (e.g., GPS devices on the vehicles), data readings from road-based traffic sensors (e.g., Bluetooth sensors embedded in road pavement), and data from other data sources. The data may be analyzed in various manners to facilitate determination of traffic condition characteristics of interest, such as estimated average travel time, traffic speed and estimated total volume of vehicles for particular segments of roads of interest, and to enable such traffic condition determinations to be performed in near-realtime manner (e.g., within a few minutes of receiving the underlying data samples).

Data obtained from multiples sources used for the calculation of average traffic time and average speed, also contains data which may be unrepresentative of actual traffic condition characteristics of interest such data obtained from road segments which are located near to the road segment of interest or the data sending sensors are not accurate etc. Such data should be filtered form the data obtained. The assessed data may then be utilized in order to perform other functions related to analyzing, predicting, forecasting, incident detection, and/or providing traffic-related information.

However, even if accurate and timely information about current traffic conditions was available from such sensors, current traffic information does not indicate future traffic conditions for roads segments of interest. Limited attempts have been made to generate and provide information about possible future traffic conditions, but such attempts have typically suffered from inaccuracies in the generated information, as well as various other problems. For example, some efforts to provide information about possible future traffic conditions have merely calculated and provided historical averages of accumulated data. While such historical averages may occasionally produce information for a particular place at a particular day and time that is temporarily similar to actual conditions, such historical averages cannot adapt to reflect specific current conditions that can greatly affect traffic, and thus the generated information can be of little practical use for planning purposes.

The features of above discussed conventional ways of gathering information about road traffic conditions are complex, costly, and inconvenient. In view of the drawbacks inherent in the conventional ways of gathering information about road traffic conditions, there exists a need of improved means for effectively computing average speed and travel time on a road segment and assessing traffic-related information, such as to determine current traffic-related information and/or predicted future traffic-related information for roads of interest.

SUMMARY OF THE INVENTION

In view of the foregoing disadvantages inherent in the prior arts, the general purpose of the present invention is to provide an improved traffic estimation system, to include the advantages of the prior art, and to overcome the drawbacks inherent therein.

In an aspect, the present invention provides a system for estimating road traffic in a road segment at a given time. The system comprises: a central server; and at least one of one or more mobile communication units installed in a vehicle passing the road segment at the given time, and one or more fixed communication units installed for detecting wireless enabled objects in vehicles passing the road segment at the given time. Each of the mobile communication unit is capable of sending a plurality of mobile spot values to the central server. Also, each of the fixed communication unit is capable of sending a plurality of detected spot values to the central server. The central server is capable of processing the at least one of the plurality of mobile spot values and the plurality of detected spot values to estimate road traffic in the road segment at the given time.

In another aspect, the present invention provides a method for estimating road traffic in a road segment at a given time. The method comprises: collecting at least one of a plurality of mobile spot values of vehicles passing the road segment at the given time, and plurality of detected spot values of detection of wireless enabled objects in vehicles passing the road segment at the given time; and processing the at least one of the plurality of mobile spot values and the plurality of detected spot values to estimate road traffic in the road segment at the given time.

In another aspect, the present invention provides method for accessing the data obtained from the vehicles for the estimation of average speed and travel time in road segment of interest. The method comprising the steps of: receiving at least a first set of spot values; computing a spot time window; forming a second set of spot values; forming a third set of spot values; computing at least a travel time for each vehicle; computing an average travel time on the road segment; computing a variance; computing a minimum and a maximum value of acceptable travel time for the road segment; forming a fourth set of spot values; checking number of spot values; and calculating the average speed and travel time of the road segment. A plurality of spot values representing vehicles travelling on a road are used for computing the average speed and travel time. At least a start geographical location and an end geographical location are adapted on the road segment for computing said average speed and travel time. The first set of spot values are received from at least one of said moving vehicle and the road side units capable of reporting collected information from on-board units in case of connected vehicle system. A checking of number of spot values is adapted to know whether the number of spot values in the fourth set of spot values is more than a predefined minimum number of spot values required for computing the average speed and travel time of the road segment. The first set of spot values may be received from at least one of the vehicles travelling on the road and from the road side units reporting collected information from on-board units in case of connected vehicle system.

In another aspect, the present invention provides a system for accessing the data obtained from the vehicles for the estimation of average speed and travel time in road segment of interest. The system comprising: means for receiving at least a first set of spot values from said vehicle; means for computing a spot time window having spot values mapped to at least said road segment; means for forming a second set of spot values; means for forming a third set of spot values; means for computing at least a travel time for each vehicle using the spot values which are in the third set of spot values; means for computing an average travel time on the road segment from the travel time for each vehicle using the spot values which are in the third set of spot values; means for computing a variance by using the average travel time in the road segment and the travel time for each vehicle using the spot values which are in the third set of spot values; means for computing a minimum and a maximum value of acceptable travel time for the road segment; means for forming a fourth set of spot values; means for checking whether the number of spot values in the fourth set of spot values is more than a predefined minimum number of spot values required for computing the average speed and travel time of the road segment; and means for calculating the average speed and travel time of the road segment. Means for repeating the above steps of the method for another time stamp, if the number of spot values in the fourth set of spot values is not more than a predefined minimum number of spot values required for computing the average segment travel time of the road segment. A plurality of spot values representing vehicles travelling on a road are used for computing an average speed and travel time. At least a start geographical location and an end geographical location are adapted on the road segment for computing said average speed and travel time In another aspect the present invention provides a computer-readable medium whose contents configure a computing device to provide information related to vehicle travel on a road, by performing the method according to the present invention.

These together with other aspects of the invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the invention.

BRIEF DESCRIPTION OF THE DRAWINGS

While the specification concludes with claims that particularly point out and distinctly claim the invention, it is believed that the advantages and features of the present invention will become better understood with reference to the following more detailed description of expressly disclosed exemplary embodiments taken in conjunction with the accompanying drawings. The drawings and detailed description which follow are intended to be merely illustrative of the expressly disclosed exemplary embodiments and are not intended to limit the scope of the present invention as set forth in the appended claims. In the drawings:

Like reference numerals refer to like parts throughout the several views of the drawings.

DETAILED DESCRIPTION OF THE DRAWINGS

The exemplary embodiments described herein detail for illustrative purposes are subject to many variations. It should be emphasized, however that the present invention is not limited to particular method of computing the average segment speed and travel time as described. Rather, the principles of the present invention may be used with a variety of configurations and structural arrangements for computing speed and travel time. It is understood that various omissions, substitutions of equivalents are contemplated as circumstances may suggest or render expedient, but the present invention is intended to cover the application or implementation without departing from the spirit or scope of the its claims.

In the following description, for purposes of explanation, numerous specific details are set forth in order to provide a thorough understanding of the present invention. It will be apparent, however, to one skilled in the art that the present invention may be practiced without these specific details.

As used herein, the term 'plurality' refers to the presence of more than one of the referenced item and the terms 'a', 'an', and 'at least' do not denote a limitation of quantity, but rather denote the presence of at least one of the referenced item. The terms 'GPS tracking device' includes 'GPS equipped mobile phone' that run specific application sending real-time location information to a remote server. The term 'moving device' includes any types of moving vehicle, for example, car, truck, bus, scooter, bile, trailer, or any other automobile.

The present invention provides methods and system for estimating road traffic by collecting and processing location and time data values of vehicles travelling on a road. Such processing of data used for computing an average segment travel time at a current time on a road segment in a simple, cost-effective and reliable manner. The system of the present invention may be mass produced inexpensively and used in an easy, robust, efficient, secure, cost effective, environment friendly and productive way.

It is to be understood that the improvements of the present invention are applicable to any of a number of methods and systems other than those which are specifically described below. Such methods and systems will be readily understood by the person of ordinary skill in the art, and are achievable by causing various changes that are themselves known in state of the art.

While computing the average travel time in a road segment of interest, a road network is assumed to be a set of connected micro-level segments that constitute the streets of different classes (major, minor, highways, connectors, collectors, etc.). Micro-level segments are usually originally defined by the GIS data provider.

A low-level segment is defined as a set of micro-level segments which are used for routing and navigation purposes. Similarly a high-level segment is defined to be a set of low-level segments. Traffic information has to be provided in high level segments. Since the traffic information is usually needed only in main roads not all low level segments belong to high level segments.

Figure 1:
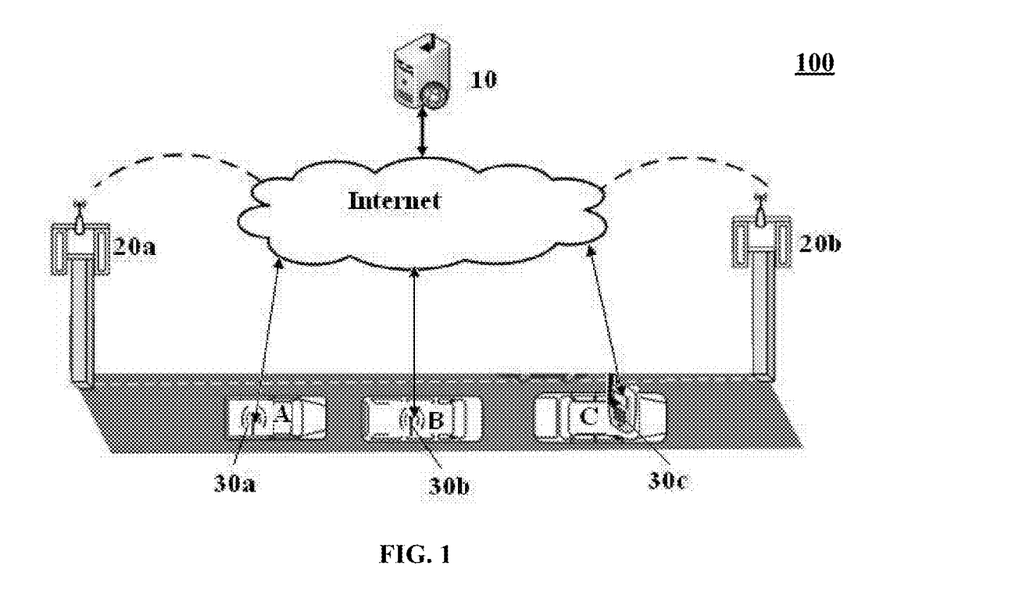
FIG. 1 illustrates a system for estimating road traffic in a road segment at a given time, according to an exemplary embodiment of the present invention.

Referring to FIG. 1 which illustrates a system 100 for estimating road traffic in a road segment at a given time, according to an exemplary embodiment of the present invention. The system 100 comprises: a central server 10; and at least one of: one or more mobile communication units 30a, 30b, 30c, . . . installed in vehicles A, B, C, . . . passing the road segment at the given time, and one or more fixed communication units 20a, 20b, . . . for detecting wireless enabled objects in vehicles A, B, C, . . . passing the road segment at the given time. Each of the mobile communication unit 30a, 30b, 30c, . . . is capable of sending a plurality of mobile spot values to the central server 10. Also, each of the fixed communication unit 20a, 20b, . . . is capable of sending a plurality of detected spot values to the central server 10. The central server 10 is capable of processing the at least one of the plurality of mobile spot values and the plurality of detected spot values to estimate road traffic in the road segment at the given time.

In an exemplary embodiment of the present invention, the central server 10 may be one of a general purpose computing device, a cluster of servers, a blade server, a virtual machine environment and a mainframe, or a combination of any of the foregoing. In an alternate embodiment, the system 100 provided by the present invention can be connected with any existing system that is capable of receiving information from either or both of the mobile communication units 30a, 30b, 30c, . . . or fixed communication units 20a, 20b, . . . ; and there is no requirement for a separate central server. Also, in another embodiment, a user travelling in one the vehicles A, B, C passing by the road segment may have a wireless communication device that is capable of receiving and processing the spot values from the fixed communication devices 20a, 20b, . . . and mobile communication devices 30a, 30b, 30c, . . . in other vehicles.

For sending the spot values, the mobile communication units 30a, 30b, 30c, . . . and fixed communication units 20a, 20b, . . . are operable connected to the central server 10 over a network. Examples of the network may include wired networks, wireless networks or a combination thereof.

As used herein, a spot value is collectively intended to refer to any type of traffic related data received from any data gathering unit of the present invention.

Specifically, a mobile spot value refers to a data record of a mobile communication unit such as time, latitude position, longitudinal position, speed, and other traffic useful information of a vehicle carrying the mobile communication unit. Such mobile communication units, in an embodiment, are GPS or GPRS enabled units that produce GPS or GPRS data over a GPS or GPRS network, respectively. A mobile communication unit is also referred herein as a probe. As used herein, GPS refers to the Global Positioning System that provides location and time information in all weather conditions, anywhere on or near the Earth where there is an unobstructed line of sight to four or more GPS satellites. As used herein, GPRS refers to the General packet radio service used for packet oriented mobile data service available to users of the 2 G cellular communication systems global system for mobile communications (GSM) and Global Positioning System that provides location and time information in all weather conditions, anywhere on or near the Earth where there is an unobstructed line of sight to four or more GPS satellites respectively.

Specifically, a detected spot value refers to a data record of a wireless enabled object in a vehicle detected by the fixed communication unit. Such data record may be in form of as time, latitude position, longitudinal position, speed, and other traffic useful information of the vehicle carrying the wireless enabled object. As used herein, 'wireless enabled objects' refer to objects which comprise a wireless communication module such that they can transfer data wirelessly or can be detected wirelessly. Examples of wireless enabled objects include, but are not limited to, mobile phones, wireless-enabled car navigation systems, in car wireless systems, wireless tags, or any other object which is enabled by wireless technology. Examples of the wireless technologies may include but are not limited to Bluetooth, Wi-Fi, 802.11p, NFC, ZigBee, GPRS, GPS and the like. The fixed communication unit, also referred herein as a sensor, may be in the form of detector having different wireless communication modules for detecting different wireless enabled objects. The fixed communication unit may be capable of detecting more than one wireless enabled object at the same time. For example, in case of Bluetooth technology, a spot value is a detected Bluetooth device (phone, in-car Bluetooth device, etc.) at a given time.

Figure 2:
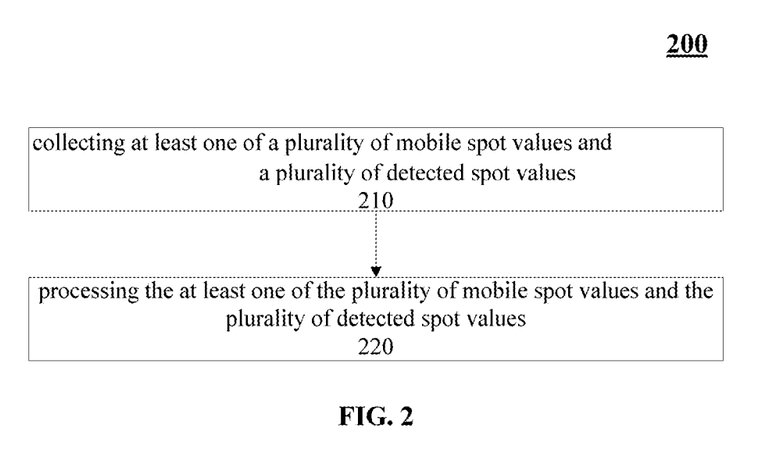
FIGS. 2 and 2A illustrate a method for estimating road traffic in a road segment at a given time, according to an exemplary embodiment of the present invention.
Figure 2A:
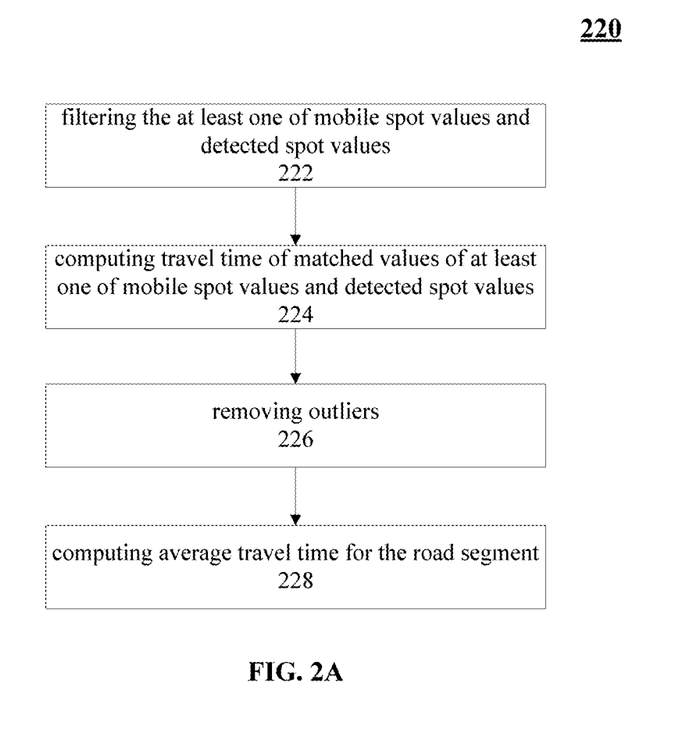

Referring FIGS. 2 and 2A which illustrate a method 200 for estimating road traffic in a road segment at a given time, according to an exemplary embodiment of the present invention. The method 200 comprises: collecting at least one of a plurality of mobile spot values of vehicles passing the road segment at the given time, and plurality of detected spot values of detection of wireless enabled objects in vehicles passing the road segment at the given time at a step 210; and processing the at least one of mobile spot values and detected spot values to estimate road traffic in the road traffic at the given time at a step 220.

A delay may be needed to the system to receive, process, and store spot values in a database and make them available for the traffic estimation algorithm.

Specifically, the processing the at least one of mobile spot values and detected spot values at the step 220 comprises: filtering the at least one of mobile spot values and detected spot values at a step 222; computing travel time of matched values of at least one of mobile spot values and detected spot values at a step 224; removing outliers at a step 226; and computing average travel time for the road segment at a step 228.

For the mobile communication units 30a, 30b, 30c, . . . , the central server 10 receives real-time location information from GPS devices deployed in vehicles A, B, C. Each location information is mapped to the micro-level segment in which the vehicle A, B, C is actually located. Invalid location records are filtered before computing the traffic information. The central server 10 receives real-time raw traffic information from multiple sources like individual probes (GPS-equipped vehicles) floating in the traffic stream across the city or Bluetooth-based traffic sensors deployed in strategic locations to discover and report detected Bluetooth devices to a central server.

Figure 3:
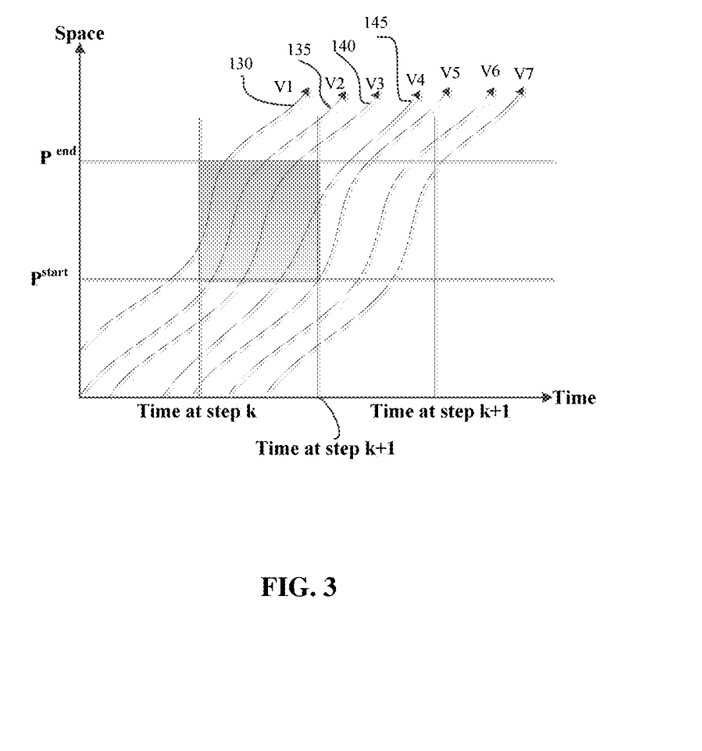
FIG. 3 illustrates a time and space illustration of segment travel time, according to an exemplary embodiment of the present invention.

Referring to FIG. 3 which illustrates a time and space illustration of segment travel time, according to an exemplary embodiment of the present invention. The closed area defined by the time between the measurement steps k and k+1 on the time axis and by the geographical location on the space axis between the positions $p^{start}$ and $p^{end}$, is referred to as the road segment of interest. It may be a portion of a highway, a street, a square or any portion of the road for which the travel time is of interest. A number of vehicles represented by $V_1$ to $V_7$ are entering and exiting the road segment at different timestamps. Some of them may not be within the measurement period between the two measurement steps as defined by the closed area. For example the entry time of vehicle $V_1$ with the trajectory 130 is not within the measurement period between step k and k+1 but its exit time is within that period. In contrast, vehicle $V_2$ with the trajectory 135 has both entry and exit times within the measurement period. Similarly the vehicle $V_3$ with the trajectory 140 has both entry and exit times within the measurement period. Vehicle $V_4$ with the trajectory 145 has entry point within the measurement period but its exit point is not after the period. Other vehicles do have either entry or exit points within the measurement period.

It can be seen from the figure that the spot values corresponding to the vehicles $V_2$ and $V_3$ the spot values which should be considered for the further steps of calculation of the segment travel time. If the spot values from the vehicles $V_1$, $V_4$, $V_5$, $V_6$, and $V_7$ are used in the process of computing the average segment travel time in the road segment without intelligent processing, then it will result in erroneous calculation. So it is important to filter such spot values.

The estimated travel time $tt_{i,s(k)}$ of vehicle i in segment s at measurement step k is computed as follows:

$$\left(t_{i,s}^{(k,first)} - t_{i,s}^{(k,last)}\right) \quad (1)$$

wherein:

$t_{i,s}^{(k,first)}$ is the timestamp of the first geopoint of vehicle i received by the system in segment s during the measurement step k;

$t_{i,s}^{(k,last)}$ is the timestamp of the last geopoint of vehicle i received by the system in segment s during the measurement step k;

$p_{i,s}^{(k,first)}$ and $p_{i,s}^{(k,last)}$ are the first and the last position of vehicle i in segment s relative to the measurement step k, respectively;

$l_i$ is the driving distance of vehicle i, such that $l_i$ is equal to the driving distance between the first and the last positions $p_s^{start}$ and $p_s^{end}$ of the vehicle i;

$p_s^{start}$ and $p_s^{end}$ are the position of the start and the end geopoints of the segment s, respectively.

$L_s$ is the length of the road segment s.

In case of fixed traffic sensors, for example, a Bluetooth traffic sensor: the first and the last position $p_s^{start}$ and $p_s^{end}$ of the vehicle i in the segment s denote/refer the positions of sensors reporting the detected moving devices; and the length $l_i$ is the driving distance between the two sensors reporting the detected moving devices.

The travel time $tt_{i,s}^{(k)}$ is for one vehicle i. To compute the average segment travel time we need to find travel times of each of the vehicles whose spot values are obtained after filtering the undesirable spot values. The average segment travel time in a road segment (say a street) is defined as the travel time or trip time which a vehicle will take for crossing that street during the period of time when the average segment travel time is calculated. By knowing the average segment travel time, a potential vehicle driver will be able to know how much approximate time he will need to cross that street. When this information is available in main streets, a traveler can plan better his trips by knowing in real-time shortest paths to destination instead of regular paths.

Figure 4:
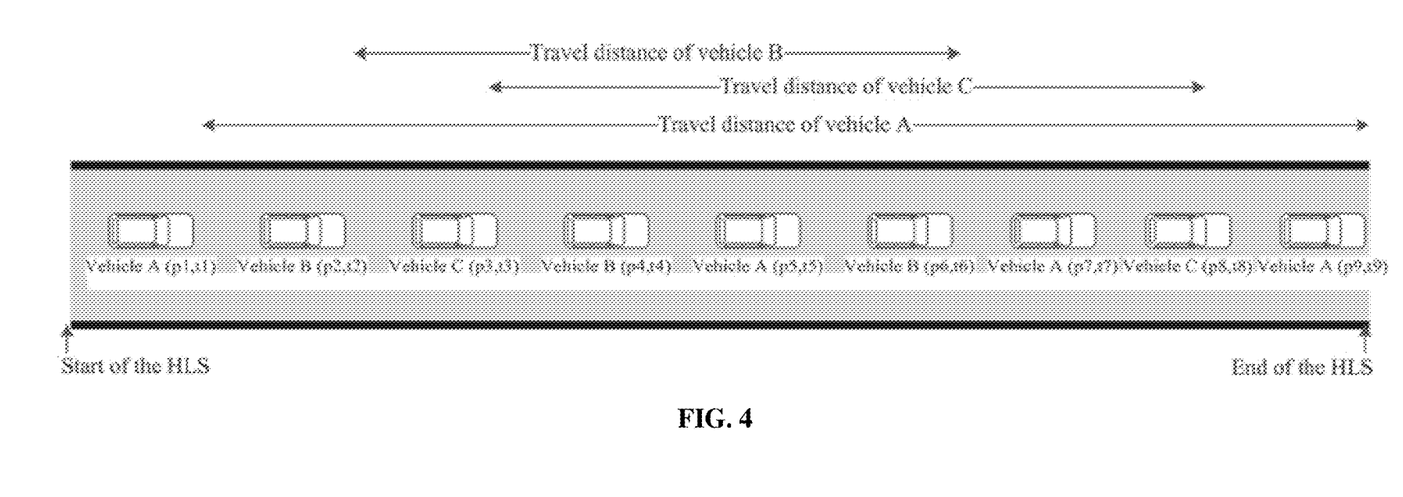
FIG. 4 illustrates a schematic view of the road segment with three vehicles sending spot values, according to an exemplary embodiment of the present invention.

Referring to FIG. 4 which illustrates a schematic view of the road segment with three vehicles sending spot values, according to an exemplary embodiment of the present invention. As shown the road segment 's' has a start and an end. These two are geographical locations on the road. There are in total three vehicles: vehicle A, vehicle B, and vehicle C shown having at least two spot values. Each of the spot value includes a position 'p' at time stamp 't'. The spot values may be received at different positions along a road segment from moving vehicles during the measurement period. In order to get an accurate estimation of the travel time of a vehicle across a road segment, it is necessary to receive at least two spot values: one close to the start of the segment and a second one close to the end the segment. As shown the vehicle A sends four, vehicle B sends three and vehicle C sends two spot values during the measurement period. The only important spot values to be considered for the computation for average segment travel time, from each of the vehicles are the spot values which are closer to the start and end positions of the road segment 's'. This is important because for whatever reasons the congestion in a segment can appear in any position in the segment (for example because of an incident or traffic signal etc.)

So in this case the considerable values for vehicle A are $(p_1,t_1)$ and $(p_9,t_9)$ only. From vehicle B considerable spot values are $(p_2,t_2)$ and $(p_6,t_6)$. Similarly for vehicle C considerable spot values are $(p_3,t_3)$ and $(p_8,t_8)$. The remaining spot values are not considered for next steps.

All the three vehicles have spot values which are considerable, however only one of them should be kept in computing the average value of the segment travel time along the road segment since the last received position from vehicle B ($p_6$) is far from the position of the end point of the segment and the distance between the first and the last position of vehicle C ($p_3$ and $p_8$) is short comparing to the total length of the road segment.

All the spot values received from different vehicles have to be assessed to satisfy the above two criterion. This will ensure that correct spot values will be considered for the computation of average segment travel time. In above case the spot values for vehicle A ($p_1,t_1$) and ($p_9,t_9$) are only taken and rest of the obtained spot values are removed.

The filtration of inconsiderable spot values looks simple for three vehicles but practically the numbers are large and this requires statistical computational techniques.

Figure 5:
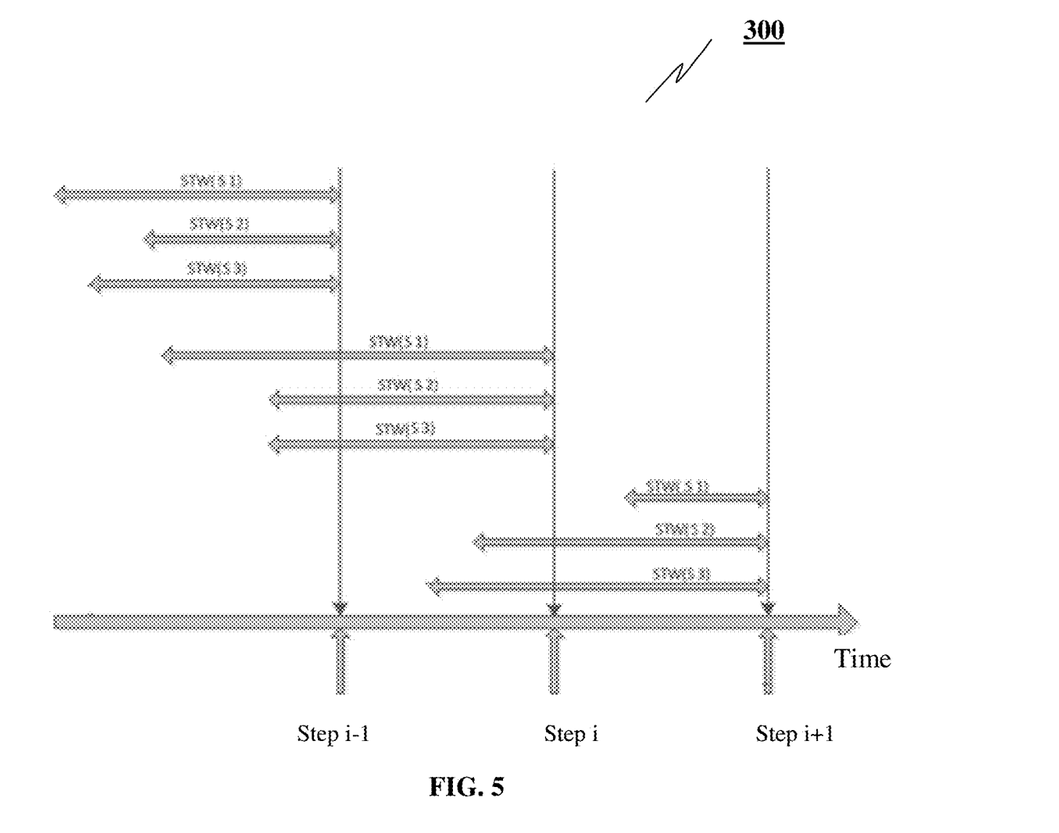
FIG. 5 illustrates a Spot Time Window of different segments from one measurement step to another, according to an exemplary embodiment of the present invention.

Referring to FIG. 5 which illustrates Spot Time Window 300 (also referred to as 'STW') of different segments from one measurement step to another, according to an exemplary embodiment of the present invention.

To compute the average value of the segment travel time of road, it is necessary to extract from the database only the set of spot values to be potentially considered in this estimation. The Spot Time Window adapted to extract the spot values mapped to every segment that may contribute to computing the average travel time in every step. The Spot Time Window (STW) for every segment 's' at measurement step 'i' at time 'T' is defined as the length of the time period during which vehicles crossing the road segment may have sent spot values that should be considered for the estimation of the average travel time in the current measurement step. It is clear from the example, this window normally change from measurement step to another according to the congestion level experiencing the segment and from road segment to road segment according to its properties like speed limit, number of lines, start/end type, and the like.

Figure 6:
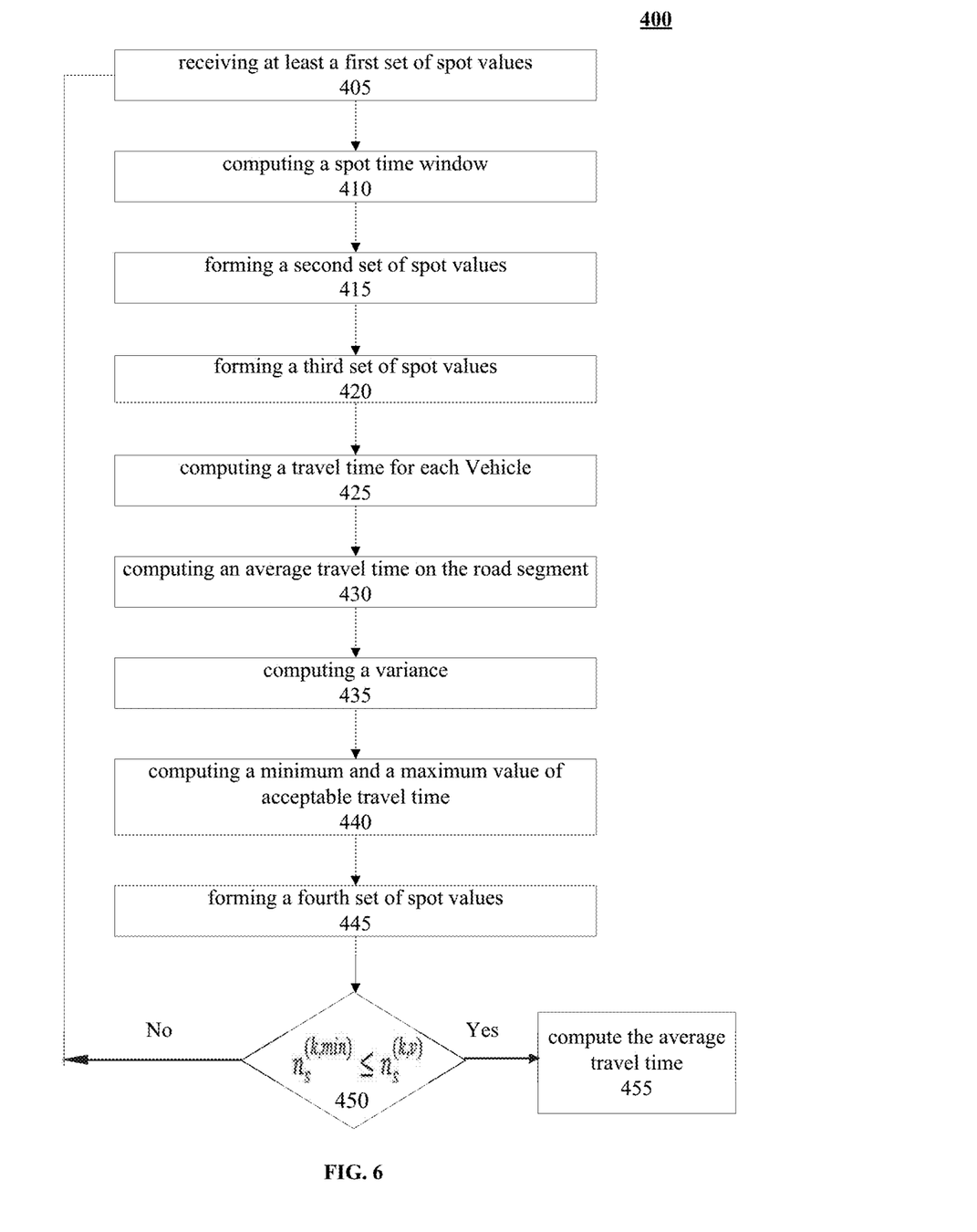
FIG. 6 illustrates a flowchart of the computer-implemented method for assessing the spot values, to be used for computing the average segment travel time, according to an exemplary embodiment of the present invention.

Referring to FIG. 6 which illustrates a flowchart of the computer-implemented method 400 for assessing the spot values, to be used for computing the average segment travel time, according to an exemplary embodiment of the present invention. The method 400 starts with step 405 of receiving a first set of spot values from at least one of the vehicles travelling on the road and from the road side units reporting collected information from on-board units in case of connected vehicle system. Specifically, method 400 starts with receiving at least a set of mobile spot values from mobile communication units 30a, 30b, 30c and a set of fixed spot values from fixed communication units 20a, 20b, (as shown in FIG. 1). Each of the spot value is indicating at least a geographical location and a time stamp of a vehicle on the road. In an exemplary embodiment of the present invention, the spot values are received from the GPS tracking devices on the vehicles A, B, C, . . . or Bluetooth sensors installed on the road segment or both or any other additional data sources. The spot values may be received at a remote server 10 which can detect, store, and then process the spot values.

In an exemplary embodiment of the present invention, the spot value received from the GPS tracking device includes a GPS data record with a time, latitude, longitude, speed. In another exemplary embodiment of the present invention, the spot values received from the Bluetooth sensor installed on the road segment includes the identifier of a detected Bluetooth device in a passing vehicle, the entry time at the sensor deployed in the beginning of the segment, and the exit time at the sensor installed at the end of the segment, and the speed of the vehicle at a given time. The average travel time and speed of the vehicle are computed by the remote system.

At a step 410 of the method 400, a Spot Time Window is computed. The Spot Time Window is a length of time period, such that the spot values falling within the Spot Time Window are used in further steps of the method 400. The Spot Time window of segment s at measurement step k is expressed as follows:

$$\max\left(STW_s^{min}, \min\left(\frac{L_s}{\min\left(\frac{V_s^{free}}{2}, \frac{\bar{v}_s^l}{2}\right)}, STW_s^{max}\right)\right) \quad (2)$$

wherein:

$\bar{v}_s^l$ is the average speed in segment s computed during the last measurement period of $$\frac{L_s}{V_s^{slow}};$$

$V_s^{free}$ is the free flow speed in segment s, the free flow speed $V_s^{free}$ is defined as the observed average speed in case there no congestion in the segment; and $STW_s^{min}$ is the minimum value of the Spot Time Window which is introduced to make sure we have enough spot values and to avoid having very low values of STW of the road segment. In an exemplary embodiment of the present invention, the default value of STW may be adapted in the range of 10 seconds to 10 minutes. In another exemplary embodiment of the present invention, a desired default value of STW may be adapted according to the requirement.

In computing this average speed, null spot value which has zero value for speed will not be accounted and a min number of spot speeds is required. A preferred value of $N_{spot}^{min}$ is 6. Under these constraints, we have $\bar{v}_s^l \neq 0$. If it is not possible to compute the average speed for any reason, the following equation may be used:

$$STW_{i,s} = STW_s^{max} = \frac{L_s}{V_s^{slow}} \quad (3)$$

Wherein:

$V_s^{slow} = \theta_{slow} * V_s^{free}$ and a preferred value of $\theta_{slow}$ is 0.1; and $V_s^{free}$ is the free flow speed.

In an exemplary embodiment of the present invention, the spot time window depends on values of an average speed in the road segment computed during last measurement period, a free flow speed in the road segment, a minimum and a maximum predefined value of the spot time window.

In an exemplary embodiment of the present invention, a suitable the minimum predefined value of the spot time window may be adapted, for example, 1 minute, 2 minutes, 5 minutes, or more than 5 minutes. This is to make sure we have enough spot values and to avoid having very low values of STW of the road segment.

The STW is a time. For the sake of explanation let's take a exemplary case where we are calculating the average segment travel time in the road segment s at time T (say 9:45). The STW obtained is 10 minutes.

At a step 415 of the method 400, a second set of spot values is formed by selecting the spot values from the first set of spot values which were received within the current time and a time defined by the current time minus the spot time window. So in our exemplary case we form a second set of spot values by selecting the spot values having timestamp between the current time 9:45 and 10 minute before i.e. 9:35. All spot values which indicate timestamp within and including the 9:35 to 9:45 are taken into the second set of spot values. Let us say the number of spot values in the second set are $n_s^k$.

Now in step 420 a third set of spot values is formed from the remaining spot values of the second set of spot values obtained after removing the spot values from the second set which have reported a first and a last received geographical location for a vehicle, such that distance between the first and the last received geographical location for the vehicle is less than a predefined fraction of the distance between the start and the end geographical location of the road segment. In an exemplary embodiment of the present invention, the predefined fraction of the distance between the start and the end geographical location of the road segment is 0.8.

Similarly removing the spot values from the second set of which have reported the last received geographical location for the vehicle, that is more than a predefined distance from the end geographical location of the road segment. In an exemplary embodiment of the present invention, the predefined distance from the end geographical location of the road segment may be adapted between 10 meters to 1000 meters. In another embodiment the spot values, which correspond to vehicles such that at least one of the geographical location of its last recorded spot value falls after the end geographical location of the road segment are not removed and become part of the third set. If the driving distance between $p_{i,s}^{(k,last)}$ and $p_s^{end}$ is higher than $d_{s,min}^{(filter)}$ which may depend on the segment nature such as highway, end to intersection/RA, etc. For this version, we assume that that $d_{s,min}^{(filter)} = 100$ m given that GPS devices are sending a spot value every 160 meters and every 10 seconds. The GPS devices may also be configured to send the spot value at any predefined distance and time, for example 10 meters or 20 meters or 50 meters and at every 2 seconds or 4 seconds or 6 seconds or 8 seconds etc. In another embodiment instead of applying the distance-to-segment end-point-based filtering, the optimal method to do this filtering is to keep only vehicles that have at least one spot value after the last one mapped to segment s and being mapped to one of the segments linked to segment s. The vehicles which report a spot value after the road segment in the next road segment is considered in the next steps of the method 400.

In an exemplary embodiment of the present invention, the step of forming the third set of spot values includes keeping the spot values from the second set, which report zero value of speed. In the data filtering process, it is required to not filter data records with speed equal to zero (null) as a vehicle may be stopped at a traffic light or because of traffic congestion. Its position at a given timestamp is important to estimate the time it takes to travel the road segment.

In another embodiment the step of forming the third set of spot values includes keeping the spot values received from the Bluetooth sensor or any other type of traffic sensors installed on the road segment. Normally, spot values coming from static traffic sensors will not be filtered. These samples may consist of travel times of vehicles detected by a Bluetooth traffic sensor. In this case, spot values that have an exit time (the time when the in-vehicle Bluetooth device is detected by the Bluetooth sensor) within the measurement period will be considered as relevant spot value.

The number of spot values in the third set after the above filtering steps is say $n_s^{(k,*)}$ spot values out of the original spot values of the second set.

At a step 425 of the method 400, travel time for each vehicle using the spot values which are in the third set of spot values is computed. The spot values form the third set, are taken and travel times are calculated for different vehicles using the equation (1).

In step 430 computing an average travel time on the road segment from the travel times as computed in step 425 for each vehicle using the spot values which are in the third set of spot values. Given the number of non-filtered vehicles crossing the road segment s during step k, the average travel time in segment s may be computed as follows:

$$tt_s^{(k,*)} = \frac{\sum_{i=1}^{i=n_s^{(k,*)}} l_i * tt_{i,s}^{(k)}}{\sum_{i=1}^{i=n_s^{(k,*)}} l_i}$$

At a step 435 of the method 400, a variance by using the average travel time $tt_s^{(k,*)}$ in the road segment and the travel time for each vehicle $tt_{i,s}^{(k)}$ using the spot values which are in the third set of spot values is computed. The formula is as shown below:

$$\sigma_s^{(k)} = \sqrt{\frac{\sum_{i=1}^{i=n_s^{(k,*)}} \left(\ln tt_{i,s}^{(k)} - \ln tt_s^{(k,*)}\right)^2}{n_s^{(k,*)} - 1}}$$

Next step 440 is computing the minimum and maximum values of acceptable travel time for the road segment. The formulas are as below:

$$tt_{min,s}^{(k)} = e^{\left(\ln tt_s^{(k,*)} - n_{s,\sigma}^{(k)} \frac{\sigma_s^{(k)}}{\sqrt{n_s^{(k,*)}}}\right)}$$

and $$tt_{max,s}^{(k)} = e^{\left(\ln tt_s^{(k,*)} + n_{s,\sigma}^{(k)} \frac{\sigma_s^{(k)}}{\sqrt{n_s^{(k,*)}}}\right)}$$

wherein $n_{s,o}^{(k)}$ is the number of standard deviations between the expected average travel time and the minimum and maximum acceptable travel time for segment s in step k. A typical value of $n_{s,o}^{(k)}$ may be 3.

The minimum and maximum values of acceptable travel times define the validity range of the travel time.

Now at a step 445 of the method 400, a fourth set of spot values is formed by selecting the spot values from the third set of spot values whose corresponding travel times are within a range of the minimum and the maximum value of acceptable travel times for the road segment including both the values. The spot values whose corresponding travel times are more than or equal to the minimum acceptable travel time $tt_{min,s}^{(k)}$ and less than or equal to the maximum acceptable travel $tt_{max,s}^{(k)}$ are selected to form the fourth set.

Lets call the number of spot values in the fourth set as $n_s^{(k,v)}$. The fourth set of size $n_s^{(k,v)} \leq n_s^{(k,*)}$ of valid recorded travel times in segments at step k is defined as:

$$\psi_s^{(k)} = \{tt_{i,s}^{(k)} \mid tt_{min,s}^{(k)} \leq tt_{i,s}^{(k)} \leq tt_{max,s}^{(k)}\}$$

At a step 450 of the method 400, it is checked that the number of spot values in the fourth set $n_s^{(k,v)}$ is more than a predefined minimum number of spot values required for computing the average segment travel time of the road segment. At this phase of the algorithm we need to make sure the following relation is valid:

$$n_s^{(k,min)} \leq n_s^{(k,v)} \leq n_s^{(k,*)} \leq n_s^k$$

If the number $n_s^{(k,v)}$ is less than the minimum required number of samples $n_s^{(k,min)}$ to get an accurate estimation of the travel time then the steps 405 to 450 of the method are repeated for another time stamp.

If the number $n_s^{(k,v)}$ is equal or higher than the minimum required number of samples $n_s^{(k,min)}$ to get an accurate estimation of the travel time then proceed with step 455 of calculating the average segment travel time of the road segment using the corresponding travel times of the spot values of the fourth set of spot values. Using the set of valid travel times, it is then possible to compute the smoothed travel time in segment s at step k. Hence, the observed average travel time is expressed as follows:

$$tt_s^{(k,v)} = \frac{\sum_{i=1}^{i=n_s^{(k,v)}} l_i * tt_{i,s}^{(k)}}{\sum_{i=1}^{i=n_s^{(k,v)}} l_i}$$

The obtained value is smoothed by using adaptive smoothing exponential techniques as follows:

$$TT_s^{(k)} = \alpha_{i,k} tt_s^{(k,v)} + (1-\alpha_{i,k}) TT_s^{(k-1)}$$

Where $\alpha_{i,k} = 1 - (1-\beta)^{n_s(k,v)}$

β is the fixed sensitivity parameter. The higher the value of β, the less sensitive is the average value to number of spot values in the current measurement step. The $\alpha_{i,k}$ increases with $n_s^{(k,v)}$. The minimum value of $\alpha_{i,k}$ is β (when $n_1 s^{1((k,v))} = 1$ which represents the minimum weight to give to the estimated speed (travel time) during the current measurement step.

$$\beta \leq \alpha_{i,k} \leq 1$$

A typical value of β could be 0.5. It is also possible to determine multiple values of the parameter β that can be associated with the traffic conditions (high congestion, low congestion, normal traffic).

In an exemplary embodiment of the present invention, the computing of the average segment travel time will be done after every predefined update time. The estimation of the travel time will be done every period of update time (TT_update) which should be set to a specific value such as 2 minutes. The computing is not done for every individual request received from user applications. This will ensure to have the same traffic information displayed to active sessions that access the traffic information services.

In an exemplary embodiment of the present invention, the computing of the average segment travel time will be done at a timestamp higher or equal to the current time plus a maximum delay taken by the spot value between its generation, reception, processing, and storage in the database. The estimation of the travel time at T for the measurement step k, should be computed at a timestamp higher or equal to $T+T_{SpotValue}^{NetSys}$ where $T_{SpotValue}^{NetSys}$ is the maximum delay taken by a spot value between its generation by the device and reception, processing, and storage in the database of the system in order to make it available for the method for estimating the average travel time. In other words, at the current time T, we will be able to estimate the average travel time at the measurement step that corresponds to a timestamp lower or equal to $T-T_{SpotValue}^{NetSys}$.

In an exemplary embodiment of the present invention, a computer-readable medium whose contents configure a computing device to provide information related to vehicle travel on a road, by performing the method 400 is provided.

In various exemplary embodiments of the present invention, the method discussed herein, e.g., with reference to FIGS. 1 to 6, may be supplemented with operations implemented through computing devices such as hardware, software, firmware, or combinations thereof, which may be provided as a computer program product, e.g., including a machine-readable or computer-readable medium having stored thereon instructions or software procedures used to program a computer to perform a process discussed herein. The machine-readable medium may include a storage device.

In other instances, well-known devices, methods, procedures, components, and circuits have not been described herein so as not to obscure the particular embodiments of the present invention. Further, various aspects of embodiments of the present invention may be performed using various means, such as integrated semiconductor circuits, computer-readable instructions organized into one or more programs, or some combination of hardware and software.

Although a particular exemplary embodiment of the invention has been disclosed in detail for illustrative purposes, it will be recognized to those skilled in the art that variations or modifications of the disclosed invention, including the rearrangement in the configurations of the parts, changes in sizes and dimensions, variances in terms of shape may be possible. Accordingly, the invention is intended to embrace all such alternatives, modifications and variations as may fall within the spirit and scope of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

What is claimed is:

1. A system for estimating road traffic in at least a road segment at a given time, comprising:
    one or more mobile communication units installed in a vehicle passing the road segment at the given time, wherein each of the mobile communication unit sends a plurality of mobile spot values to a central server;
    one or more fixed communication units installed for detecting wireless enabled objects in vehicles passing the road segment at the given time, wherein each of the fixed communication unit sends a plurality of detected spot values to the central server;
    a spot time window of a traffic estimation module for extracting from a database of the central server the plurality of mobile spot values and the plurality of detected spot values mapped to each road segment for computing an average travel time of the passing vehicle;
    wherein the traffic estimation module for computing an average speed and the average travel time of at least the vehicle on at least the road segment at the given time, comprising:
        collecting at least one of the plurality of mobile spot values of the vehicles passing the road segment at the given time, and the plurality of detected spot values of detection of wireless enabled objects in the vehicles passing the road segment at the given time;
        filtering undesirable spot values of at least one of the plurality of mobile spot values and the plurality of detected spot values for obtaining matched values of at least one of the plurality of mobile spot values and the plurality of detected spot values;
        computing travel time of matched values of at least one of the plurality of mobile spot values and the plurality of detected spot values;
        removing outliers; and
        computing the average travel time of the passing vehicle for the road segment,
    wherein the spot time window changes from an one computing step to an another computing step according to a congestion level that the road segment is experiencing and from an one road segment to an another road segment according to properties of said road segments, wherein said properties include moving vehicle speed limit of said road segments, number of lines of said road segments, start of said road segments, add end of said road segments,
    wherein the central server process at least one of the plurality of mobile spot values and the plurality of detected spot values to estimate road traffic in the road segment at the given time.

2. The system of claim 1, wherein the spot time window for a road segment 's' at a measurement step 'i' at a time 'T' is a length of a time period during which vehicles crossing the road segment 's' sent the plurality of mobile spot values that are considered for the estimation of the average travel time in the measurement step 'i'.

3. A traffic estimation method for computing an average speed and travel time at a current time of at least a moving vehicle on at least a road segment, the method comprising the steps of:
    receiving at least a first set of spot values from at least one of a plurality of mobile communication units of a plurality of moving vehicles passing at least the road segment at a given time and a plurality of fixed communication units of the road segment at the given time, wherein an each of the first set of spot values is indicating at least a geographical location and a time stamp of at least the moving vehicle on the road segment at the given time;

filtering undesirable spot values of at least the first set of spot values for obtaining matched values of at least the first set of spot values;

computing a spot time window having spot values mapped to at least the road segment;

forming a second set of spot values;

forming a third set of spot values from remaining spot values of the second set of spot values;

computing at least a travel time for at least the moving vehicle using the spot values which are in the third set of spot values;

computing an average travel time on the road segment from the travel time for at least the moving vehicle using the spot values which are in the third set of spot values;

computing a variance by using the average travel time on the road segment and the travel time for each moving vehicle using the spot values which are in the third set of spot values;

computing a minimum and a maximum value of acceptable travel time for the road segment;

forming a fourth set of spot values by selecting the spot values from the third set of spot values whose corresponding travel times are within a range of the minimum and the maximum value of acceptable travel times for the road segment including the minimum value and the maximum value;

checking whether number of spot values in the fourth set of spot values is more than a predefined minimum number of spot values required for computing the average speed and travel time of the road segment;

filtering undesirable spot values of the fourth set for matching between spot values of at least one of the plurality of mobile spot values and the plurality of detected spot values;

computing travel time of matched values of spot values;

removing outliers;

calculating the average speed and travel time of the road segment; and repeating the above steps of the method for another time stamp, if the number of spot values in the fourth set of spot values is not more than a predefined minimum number of spot values required for computing the average segment travel time of the road segment, wherein at least the mobile communication units installed in vehicles passing the road segment at the given time sends the plurality of mobile spot values to a central server;

wherein at least the fixed communication units installed for detecting wireless enabled objects in vehicles passing the road segment at the given time sends the plurality of detected spot values to the central server;

wherein the spot time window extracts from a database of the central server the plurality of spot values mapped to every road segment for computing the average travel time of the passing vehicle for the road segment, wherein the plurality of spot values representing vehicles travelling on a road are used for computing the average speed and travel time, wherein at least a start geographical location and an end geographical location are adapted on the road segment for computing said average speed and travel time, wherein the first set of spot values are received from at least one of said moving vehicle and the road side units report collected information from on-board units in case of a connected vehicle system.

4. The method of claim 3, wherein each of the spot value indicating at least one of a geographical location and a time stamp of the vehicle on the road segment.

5. The method of claim 3, wherein the spot time window is a length of time period during which moving vehicles crossing the road segment have sent spot values which are falling within the spot time window for the estimation of the average travel time in a current measurement steps of the method.

6. The method of claim 3, wherein the second set of spot values is formed by selecting each spot value from the first set of spot values which were received within the current time and a time defined by the current time minus the spot time window.

7. The method of claim 3, wherein an estimated travel time $tt_{i,s}^{(k)}$ of a vehicle 'i' in a road segment 's' at a measurement step 'k' is computed as $$tt_{i,s}^{(k)} = \frac{L_s}{l_i}(t_{i,s}^{(k,first)} - t_{i,s}^{(k,last)});$$

wherein $t_{i,s}^{(k,first)}$ is a timestamp of a first geopoint of the vehicle 'i' received by a traffic estimation module in the road segment 's' during the measurement step 'k';

wherein $t_{i,s}^{(k,last)}$ is a timestamp of a last geopoint of the vehicle 'i' received by the traffic estimation module in the road segment 's' during the measurement step 'k';

wherein $p_{i,s}^{(k,first)}$ and $p_{i,s}^{(k,last)}$ are a first and a last position of the vehicle 'i' in the road segment 's' relative to the measurement step 'k', respectively;

wherein $l_i$ is a driving distance of the vehicle 'i', such that the $l_i$ is equal to a driving distance between the first and the last positions $p_s^{start}$ and $p_s^{end}$ of the vehicle 'i';

wherein $p_s^{start}$ and $p_s^{end}$ are a position of the first geopoint and the last geopoint of the segment 's', respectively; and wherein $L_s$ is a length of the road segment 's'.

8. The method of claim 7, wherein said remaining spot values of the second set of spot values obtained by the steps of:

removing the spot values from the second set of spot values which have reported at least a first geographical location and a last received geographical location for said moving vehicle such that distance between the first and the last received geographical location for said moving vehicle is less than a predefined fraction of the distance between the start and the end geographical location of the road segment; and removing the spot values from the second set of spot values which have reported the last received geographical location for the vehicle, that is more than a predefined distance from the end geographical location of the road segment.

9. The method according to claim 3, wherein the step of forming the third set of spot values includes keeping the spot values from the second set of spot values, which correspond to vehicles such that at least one of the geographical location of its last recorded spot value falls after the end geographical location of the road segment.

10. The method according to claim 3, wherein the step of forming the third set of spot values includes keeping the spot values from the second set of spot values, which report to zero value of speed.

11. The method of claim 3, wherein the fourth set of spot values is formed by selecting the spot values from the third set of spot values whose corresponding travel times are within a range of the minimum and the maximum value of acceptable travel times for the road segment including both the values.

12. The method of claim 3, wherein the average segment travel time of the road segment is calculated by using the corresponding travel times of the spot values of the fourth set of spot values.

13. The method according to claim 3, wherein the step of receiving spot values from the vehicles includes receiving spot values from a list including a GPS tracking device on the vehicle, a GPS-equipped mobile device in the vehicle or any traffic sensor like a Bluetooth sensor installed on the road segment or any combination thereof.

14. The method according to claim 13, wherein the spot value received from the GPS tracking device includes at least one of a GPS data record with a time, a latitude, a longitude, a speed or any combination thereof.

15. The method according to claim 13, wherein the spot value received from the Bluetooth sensor installed on the road segment includes at least one of a detection of Bluetooth device of the vehicle, an identifier, an entry time, an exit time, a class of device, a speed of the vehicle at a given time or any combination thereof.

16. The method according to claim 13, wherein the step of forming the third set of spot values includes keeping the spot values received from the Bluetooth sensor installed on the road segment.

17. The method according to claim 13, wherein computing of the average segment travel time will be done after every predefined update time.

18. The method according to claim 3, wherein the spot time window depends on values of at least one of an average speed in the road segment computed during last measurement period, a free flow speed in the road segment, a minimum and a maximum predefined value of the spot time window or any combination thereof.

19. The method according to claim 18, wherein a minimum predefined value of the spot time window is adapted between 10 seconds to 10 minutes.

20. The method according to claim 3, wherein the computing of the average segment travel time will be done at a timestamp higher or equal to the current time plus a maximum delay taken by the spot value between its generation, reception, processing, and storage in the database.

21. The method according to claim 3, wherein a predefined fraction of the distance between the start geographical location and the end geographical location of the road segment is at least 0.8.

22. The method according to claim 3, wherein the predefined distance from the end geographical location of the road segment is adapted between 10 meters to 1000 meters.

23. The method of claim 3, wherein the spot time window for a road segment 's' at a measurement step 'i' at a time 'T' is a length of a time period during which vehicles crossing the road segment 's' sent the plurality of mobile spot values that are considered for the estimation of the average travel time in the measurement step 'i'.

* * * * *